United States Patent
Sciog et al.

(10) Patent No.: US 11,065,761 B2
(45) Date of Patent: Jul. 20, 2021

(54) ROBOTIC PICKING TRAINING TECHNIQUE

(71) Applicant: Dematic Corp., Grand Rapids, MI (US)

(72) Inventors: Robert C. Sciog, Half Moon Bay, CA (US); Laszlo T. Szebelledy, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 356 days.

(21) Appl. No.: 16/044,606

(22) Filed: Jul. 25, 2018

(65) Prior Publication Data
US 2019/0030712 A1 Jan. 31, 2019

Related U.S. Application Data

(60) Provisional application No. 62/536,606, filed on Jul. 25, 2017.

(51) Int. Cl.
| | | |
|---|---|---|
| *B25J 9/16* | (2006.01) | |
| *B25J 11/00* | (2006.01) | |
| *B25J 13/08* | (2006.01) | |
| *G05B 19/02* | (2006.01) | |

(52) U.S. Cl.
CPC ............. *B25J 9/163* (2013.01); *B25J 9/1612* (2013.01); *B25J 9/1661* (2013.01); *B25J 9/1674* (2013.01); *B25J 11/0005* (2013.01); *B25J 13/087* (2013.01); *G05B 19/02* (2013.01); *B25J 9/1694* (2013.01); *G05B 2219/39107* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 3,881,605 A | * | 5/1975 | Grossman .............. | B25J 19/021 414/730 |
| 4,305,130 A | * | 12/1981 | Kelley .................. | B25J 19/023 318/640 |

(Continued)

FOREIGN PATENT DOCUMENTS

| | | |
|---|---|---|
| WO | 2017053276 A1 | 3/2017 |
| WO | 2018017612 A1 | 1/2018 |

OTHER PUBLICATIONS

International Search Report and Written Opinion of the International Searching Authority from corresponding Patent Cooperation Treaty (PCT) Application No. PCT/IB2018/55556, indicated completed Oct. 21, 2018.

*Primary Examiner* — Jonathan L Sample
(74) *Attorney, Agent, or Firm* — Gardner, Linn, Burkhart & Ondersma LLP

(57) ABSTRACT

A method of training a robot to pick a plurality of articles includes determining an identity of an article and determining if the article has a uniform distribution of weight. If the article has a uniform distribution of weight, a three-dimensional (3D) model of the article is created and stored in a database record associated with the identity. If the article does not have a uniform distribution of weight, a 3D model is created, two-dimensional (2D) images of each side of the article are created, and a 3D center of gravity of the article is determined. The 3D model, the 2D images, and the 3D center of gravity of the article are stored in a database record associated with the identity of the article.

16 Claims, 5 Drawing Sheets

(56) References Cited

U.S. PATENT DOCUMENTS

| | | | |
|---|---|---|---|
| 7,366,585 B2* | 4/2008 | Schnoor | B25J 9/1638 700/213 |
| 7,769,482 B2* | 8/2010 | Pannese | H01L 21/67184 700/121 |
| 8,688,264 B2* | 4/2014 | Nignon | B65G 47/90 700/223 |
| 8,984,136 B1* | 3/2015 | Francis, Jr. | G06F 16/2468 709/226 |
| 9,333,649 B1* | 5/2016 | Bradski | G06T 7/60 |
| 9,381,645 B1* | 7/2016 | Yarlagadda | B25J 9/1633 |
| 9,399,557 B1* | 7/2016 | Mishra | G01G 11/00 |
| 9,785,911 B2* | 10/2017 | Galluzzo | G05D 1/0088 |
| 9,796,529 B1* | 10/2017 | Hoareau | G06Q 10/04 |
| 10,810,540 B1* | 10/2020 | Gopal | G01G 19/387 |
| 2001/0056313 A1* | 12/2001 | Osborne, Jr. | B25J 13/003 700/245 |
| 2004/0265110 A1* | 12/2004 | Schnoor | B25J 9/1638 414/729 |
| 2005/0137744 A1* | 6/2005 | Winkelmolen | B07C 5/34 700/223 |
| 2006/0012198 A1* | 1/2006 | Hager | B25J 15/0009 294/106 |
| 2006/0111811 A1* | 5/2006 | Okamoto | B25J 9/0003 700/214 |
| 2007/0239315 A1* | 10/2007 | Sato | B25J 9/1612 700/245 |
| 2007/0282485 A1* | 12/2007 | Nagatsuka | B25J 9/1671 700/245 |
| 2011/0166696 A1* | 7/2011 | Nignon | B25J 11/0045 700/223 |
| 2012/0253512 A1* | 10/2012 | Sato | B25J 9/1661 700/245 |
| 2013/0211593 A1* | 8/2013 | Domae | B25J 9/1612 700/258 |
| 2013/0238129 A1* | 9/2013 | Rose | B25J 9/1612 700/258 |
| 2014/0163731 A1* | 6/2014 | Shi | B25J 9/1669 700/250 |
| 2014/0316573 A1* | 10/2014 | Iwatake | B25J 9/1697 700/258 |
| 2015/0360368 A1* | 12/2015 | Shin | B25J 13/088 700/253 |
| 2016/0016311 A1* | 1/2016 | Konolige | B25J 9/1612 700/245 |
| 2016/0016315 A1* | 1/2016 | Kuffner, Jr. | B25J 9/1676 700/255 |
| 2017/0024896 A1* | 1/2017 | Houghton | H04N 13/243 |
| 2017/0080566 A1* | 3/2017 | Stubbs | B25J 9/163 |
| 2017/0326739 A1* | 11/2017 | Nakazato | B25J 9/1612 |
| 2018/0003544 A1* | 1/2018 | Skr Dderdal | B26D 7/0625 |

* cited by examiner

ROBOTIC PICKING TRAINING TECHNIQUE

CROSS REFERENCE TO RELATED APPLICATIONS

The present application claims the filing benefit of U.S. provisional application Ser. No. 62/536,606, filed Jul. 25, 2017, which is hereby incorporated by reference herein in its entirety.

FIELD OF THE INVENTION

The present invention is directed to robotic article retrieval, and, in particular, to the creation of a database of article models to aid in the robotic package retrieval.

BACKGROUND OF THE INVENTION

Automated storage and retrieval systems (ASRS) provide for automated receiving, putting away, and retrieving of stock within a warehouse. Packaged goods (products) arrive at the warehouse and are moved about and stored in defined locations within the warehouse. Typically, packages or articles (of the packaged goods) are moved as needed within the warehouse for order fulfillment and package stocking, and any necessary movement of packages may involve the picking of a package by a robotic package retrieval mechanism. Such packages picked and moved about the warehouse are of varying size, weight, and weight distribution, and randomly oriented.

SUMMARY OF THE INVENTION

The present invention provides for a robotic package retrieval system. An exemplary robotic package retrieval system is configured to pick a selected package or article that has been placed into a picking station. The article is randomly oriented at the picking station. The robotic package retrieval system determines an optimal picking location on the article by identifying the article and retrieving a corresponding model for the identified article. The model is stored in a database as a record. The database record may include one or more of: an article classification (e.g., box, deformable object (bag), or asymmetrical object), a description of the article's distribution of weight, 3D surface model, 3D center of gravity, 2D models, as well as additional attributes of that article. The optimal picking location on the article is defined by the corresponding article model. Embodiments of the present invention include methods and an apparatus for training a robotic package retrieval system to select an optimal picking location of a particular article by creating a model for the article and storing that model in the database as a record.

In one form of the present invention, a method is provided for training a robot to pick a plurality of articles. The method includes determining an identity of an article from the plurality of articles and determining if the identified article has a uniform distribution of weight. Such an article has a three-dimensional (3D) center of gravity in a location substantially in the center of the article. If the article has a uniform distribution of weight, the method includes creating at least one model of the article. The method also includes storing the at least one model or a location of the at least one model in a database record based at least in part on the identity of the article. If the article does not have a uniform distribution of weight, the method includes creating at least one model of the article and determining the location of the 3D center of gravity of the article. At least the article model and the 3D center of gravity, or their locations, are stored in a database record based at least in part on the identity of the article.

In an aspect of the present invention, the at least one model is a 3D model. The method may also include creating a two-dimensional (2D) image of each side of the article when the article does not have a uniform distribution of weight. The 2D images are stored along with the 3D model. In a further aspect of the present invention, creating the 2D images includes rotating the article such that each face of the article is in turn directed towards an imaging camera, wherein the imaging camera captures a 2D image of each face of the article. Creating the 2D images may also further include projecting an outline of the 3D model onto each of the 2D images and discarding the portions of the 2D image that are outside of the outline. Optionally, a pair of opposing imaging cameras may be used in place of the single imaging camera.

In yet another aspect of the present invention, determining the location of the 3D center of gravity of an article includes determining a first horizontal center of gravity of the article. The article is then rotated on a horizontal axis and then tilted. A second horizontal center of gravity is then determined. The article may be rotated greater than 30 degrees. The 3D center of gravity is determined, based at least in part on the first horizontal center of gravity and second horizontal center of gravity. The first horizontal center of gravity and the second horizontal center of gravity may further include weighing the article by placing the article on a support coupled with at least three weight sensors. Optionally, the support may be coupled with four weight sensors. The article may be identified by reading a stock keeping unit (SKU) located on the article. The method may also include generating a point cloud and storing the point cloud if generation of the point cloud takes longer than a predetermined amount of time.

In another form of the present invention, a method is provided for picking an article with a robotic manipulator. The method includes determining an identity of the article, and accessing, based at least in part on the determined identity of the article, a database record including at least a three-dimensional (3D) model of the article and a location of a 3D center of gravity of the article. The method also includes determining an orientation of the article based at least in part on the 3D model and determining a picking location of the article based at least in part on the orientation of the article and the location of the 3D center of gravity. The article is picked by engaging the article with the robotic manipulator at the picking location. Determining the orientation may also be based at least in part on a point cloud generated from the 3D model.

In a further form of the present invention, a method is provided for picking an article with a robotic manipulator. The method includes determining an identity of an article from the plurality of articles, and determining if the identified article has a uniform distribution of weight. Such an article has a three-dimensional (3D) center of gravity in a location substantially in the center of the article. If the article has a uniform distribution of weight, a 3D model of the article is created. The 3D model, or its location, is stored in a database record based at least in part on the identity of the article. If the article does not have a uniform distribution of weight, the method includes creating a 3D model of the article, creating a 2D image of each side of the article, and determining the location of the 3D center of gravity of the article. At least the 3D model and the 2D images, or their locations, and the 3D center of gravity, are stored in a database record based at least in part on the identity of the article.

In an aspect of the present invention, the method also includes accessing, based at least in part on the determined identity of the article, a database record that includes at least a 3D model of the article, and a location of a 3D center of gravity of the article. The method also includes determining an orientation of the article based at least in part on the 3D model, and then determining a picking location of the article that is based at least in part on the orientation of the article and the location of the 3D center of gravity. The article is picked by engaging the article with the robotic manipulator at the picking location of the article.

Creating the 2D images may also include rotating the article such that each face of the article is directed towards an imaging camera, with the imaging camera capturing a 2D image of each face of the article. Creating the 2D images may also include projecting a corresponding outline of the 3D model onto each of the 2D images and discarding the portions of the 2D images that are outside of the outline.

In an aspect of the present invention, determining the location of the 3D center of gravity may include determining a first horizontal center of gravity of the article. The article is then rotated, for example by 90 degrees, on a horizontal axis, and then tilted. Then a second horizontal center of gravity is determined. The 3D center of gravity is determined, based at least in part on the first horizontal center of gravity and the second horizontal center of gravity. Optionally, the article may be rotated by less than 90 degrees to some orientation that is sufficient such that the determination of the second horizontal center of gravity results in an accurate 3D center of gravity. Determining the first horizontal center of gravity and the second horizontal center of gravity further include weighing the article by placing the article on a support coupled with at least three weight sensors. Optionally, the support may be coupled with four weight sensors. The article may be identified by reading a stock keeping unit (SKU) located on the article. The method may include generating a point cloud (from the 3D model) and storing the point cloud if the generation of the point cloud takes longer than a predetermined amount of time. The orientation of the article may be determined, at least in part, by rotating the point cloud until the point cloud's orientation matches that of the article.

In yet another form of the present invention, a picking training system is provided that includes an article support with at least three weight sensors configured to determine the weight of the article. At least one camera is included that is configured to capture an image of the article. Additionally, a controller is included that is configured to receive weight data from the at least three weight sensors and image data from the at least one camera. The controller is also configured to determine a three-dimensional (3D) center of gravity based on at least the weight data and to create a 3D model of the article based on at least the dimensions of the article and the image data.

In an aspect of the present invention, the article support may be configured to rotate and orient the article with respect to the at least one camera. The controller may be configured to control the rotation of the article support. The at least three weight sensors may include four weight sensors located equidistance from each other. The image data may include two-dimensional (2D) images containing at least portions of the article. The controller may be further configured to project a corresponding outline of the 3D model onto each of the 2D images and to discard portions of the 2D image that are outside of the outline. The controller may be further configured to determine a point cloud from the 3D model and determine an orientation of the article by rotating the point cloud until the point cloud's orientation matches that of the article.

These and other objects, advantages and features of this invention will become apparent upon review of the following specification in conjunction with the drawings.

DETAILED DESCRIPTION OF THE PREFERRED EMBODIMENT

Figure 1:
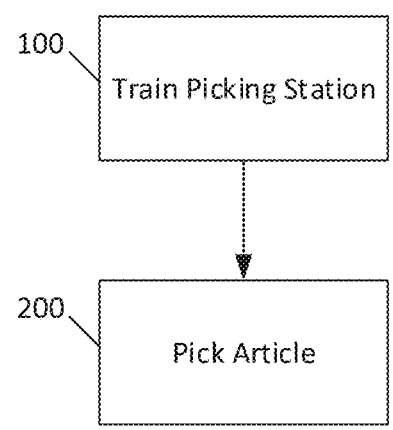
FIG. 1 is a flow chart of a method of training a robot and picking an article according to an embodiment of the invention.

Referring now to the drawings and the illustrative embodiment depicted therein, an article-picking training method may be carried out to improve picking performed by robotic package retrieval systems (robots) in an order fulfillment facility. The term "order fulfillment facility" is intended to be defined broadly as any facility that uses robotic package retrieval systems that include robots and robotic manipulators to process (handle) large quantities of articles or inventory. Such locations make use of autonomous "picking" or "pick and place" robots in order to increase efficiency and production. These robots are capable of picking up an article at a first location and moving the article to another location. Such picking systems have a need to "pick" articles as quickly and efficiently as possible. However, articles often lack a uniform distribution of weight and arrive at the picking station in a variety of orientations. The picking system must select a picking location on the article to successfully pick the article, but the weight and orientation of the article often make this selection suboptimal. This can lead to inefficiencies and reduce throughput through the picking system. Embodiments of the present invention overcome these issues by training the picking system to determine an optimal picking location of an article regardless of the article's weight distribution or current orientation. Such training allows the picking system to locate a randomly oriented article positioned at the picking station.

As described herein, an optimal picking location of an article is defined at least in part from a corresponding database record for the particular article. The database record includes article attributes that may include one or more 3D models, 2D images of the article, a location of the 3D center of gravity, and other attributes of the article necessary to aid in selecting an optimal picking location on the article. Such article attributes may include a classification of the article (e.g., whether the article is a box, a deformable object (bag), or an asymmetrical object), the article's dimensions, and any labels, etc. These attributes may also indicate whether the corresponding article is "balanced" or "unbalanced" (whether the article's weight distribution is uniform), whether there are any surface irregularities, and whether the article packaging is translucent, etc. The article attributes may impose restrictions on the pick-able surfaces of a given article. Pick offsets and non-pickable surfaces may be stored as article attributes to aid in preventing a robot from dropping the article during handling.

As illustrated in FIG. 1, an embodiment of the invention describes two distinct steps. A first step 100 of training a picking station, and a second step 200 of picking up an article with the trained picking station. Both of these steps are described in detail in FIG. 3 and FIG. 5, respectively. The training at step 100 includes the creation of a corresponding database record for each article. The database record of a particular article is used by the picking station to facilitate the picking of the article at step 200. Both the training and the picking are described in more detail below.

Figure 2:
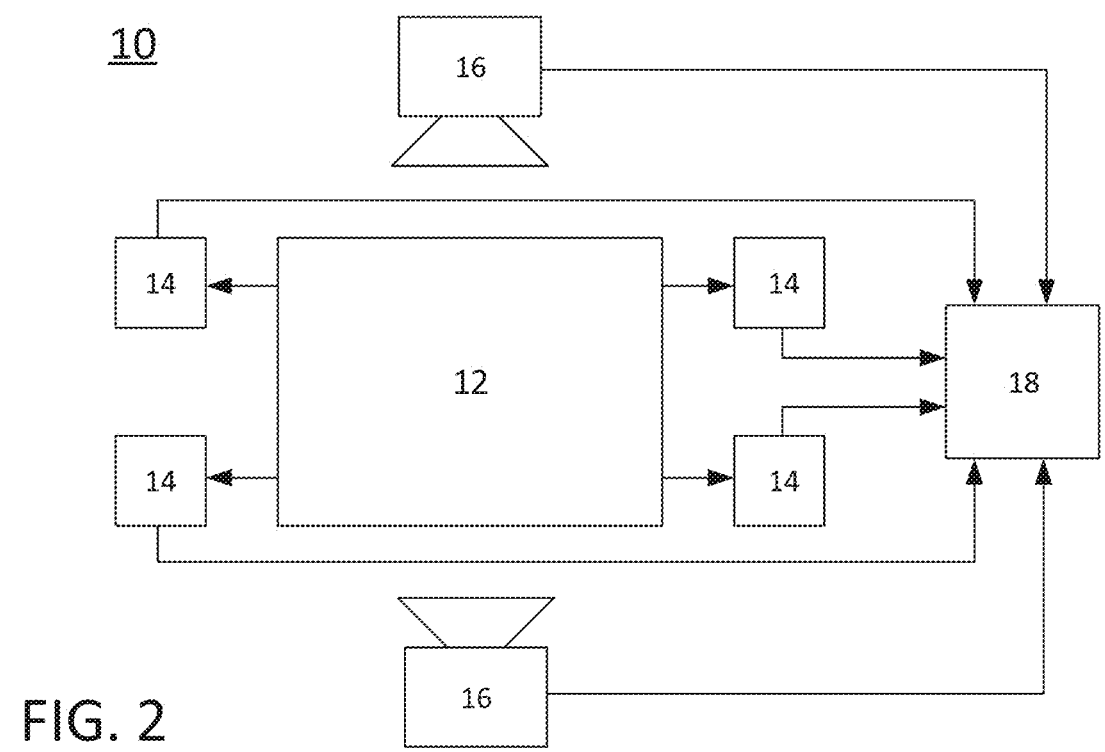
FIG. 2 is a block diagram of a picking training system according to an embodiment of the invention.

Referring now to FIG. 2, a training system 10 includes an article support 12 that supports an article (not shown) that has been selected to train the training system 10 (with respect to that selected article). As described herein, "training" the training system 10 with respect to a particular article creates a corresponding database record that includes attributes and models of the article. The article may be placed upon or within the article support 12. The training system 10 may include at least three weight sensors 14. As illustrated in FIG. 2, an exemplary embodiment includes four weight sensors 14 coupled to the article support 12. Each weight sensor 14 is configured to determine a respective portion of the weight of the article placed on or in the article support 12. In addition, the training system 10 includes at least one camera 16. As illustrated in FIG. 2, an exemplary embodiment includes two cameras 16 that are positioned such that at least a portion of the article is within each camera's field of view. As also illustrated in FIG. 2, each camera 16 has a separate field of view. A controller 18 is in electrical communication with the weight sensors 14 and cameras 16. The controller 18 is configured to receive weight data from the weight sensors 14 and image data from the cameras 16. The controller 18 is configured to determine a center of gravity of the article positioned on or in the article support, as defined by at least the weight data received from the weight sensors 14. The controller 18 is further configured to create a model of the article based at least on the image data from the cameras 16. The controller 18, based at least in part on the location of the center of gravity and the model, determines an optimal picking location of the article.

The article support 12 may be of any shape, material, or size suitable to hold articles that are to be picked. The article support 12 may be capable of rotating. This rotation may allow the article to be properly oriented with the cameras 16, without the need to manually readjust the article's position. The rotation of the article support 12 may be controlled manually (by an operator) or by the controller 18, such that the article support 12 rotates at a predetermined angle for the cameras 16. The article support 12 itself may rotate, or the article support 12 may sit upon a device that rotates, such as a turntable. The article support 12 may also be capable of tilting to some angle. The article may be placed on the article support 12 in a specific manner to provide a common reference between the article and the training system 10. For example, the article may always be placed on or in the article support 12 such that the longest side of the article is aligned with the X-axis of the article support 12, the second longest side of the article is aligned with the Y-axis of the article support 12, and the shortest side of the article is aligned with the Z-axis of the article support 12. The article support 12 may also contain markings to help align the article into specific orientations when the article is placed onto the article support 12.

Each weight sensor 14 is configured to measure a respective portion of the weight of the article placed onto or in the article support 12. The sum of the weights measured by each of the sensors 14 will equal the total weight of the article. Using proportionate weight data, routine mathematics may be used to determine a horizontal center of gravity of the particular article. For example, the training system 10 might include four weight sensors 14, and the article support 12 might include four contacts with the surface below the article support 12. Each weight sensor 14 may then be disposed between the article support 12 and the surface below the article support 12 at the four respective corners of the article support 12. In this way, the weight sensors 14 will hold the entire weight of the article support 12 and any article upon or in it. Using the known locations of the weight sensors 14 and the article, the controller 18 is configured to use the weight data from each sensor 14 to calculate a horizontal center of gravity of the article. Simple calibration procedures allow for the weight sensors 14 to compensate for the weight of the article support 12 and to determine the weight of only the article itself. This calibration may be accomplished at the controller 18 or at the weight sensors 14 themselves (before the article is placed on the article support 12).

The cameras 16 of the training system 10 are positioned to capture an image of each face or side of the article. This may be accomplished in a number of ways. The article may be repositioned manually in front of one or more camera 16 until each face of the article is captured. Alternatively, the support 12 may rotate to orient (and re-orient) the article either manually or automatically. Additionally, the training system 10 may use more than one camera 16 to either capture multiple faces simultaneously or to capture composite images of multiple faces. In such a scenario, the controller 18 may process the images into individual images for each face of the article.

The controller 18 is configured to receive weight data from the weight sensors 14 and image data from the cameras 16. The controller 18 may be any suitable computing device, such as a processor, microprocessor, or FPGA. The controller 18 may also receive the dimensions of the particular article. These dimensions may be received manually through the input of an operator, or automatically from a camera or other measuring tool. The controller 18 may use these dimensions to generate a three-dimensional (3D) model of the article.

The controller 18 may also use the weight data to determine a first horizontal or two-dimensional (2D) center of gravity of the article. The controller 18 can make such a determination using well known and routine mathematics. In order for the controller 18 to obtain a true, or 3D, center of gravity of the article, it must determine a second horizontal center of gravity of the article that is distinct from the first horizontal center of gravity of the article. To accomplish this, the article is rotated on a horizontal axis and tilted. The rotation preferably would be greater than 30 degrees, with 90 degrees being typical. The rotation of the article could be accomplished manually by the operator or automatically by rotating of the article support 12. Similarly, tilting the article may be accomplished manually by the operator or automatically by titling the article support 12. In the alternative, when the article cannot be tilted, the article is rotated and then placed face down on the article support 12. After rotation and titling, the controller 18 will receive new weight data from the weight sensors 14 and determine a second horizontal center of gravity of the article. The mathematical intersection of the first center of gravity and the second center of gravity constitutes the 3D center of gravity. Therefore, by using both the first horizontal center of gravity and the second horizontal center of gravity, the controller can determine the 3D center of gravity. The determining a location of the 3D center of gravity of the article helps provide an optimal picking location of the article. Due to all articles rotating about their respective centers of gravity, the nearer the picking location is to a particular article's center of gravity, the less rotational force a robotic manipulator must overcome.

As discussed herein, the controller 18 is also configured to receive image data from the camera(s) 16. Each camera 16 is positioned to capture a 2D image of a portion of the article. Optionally, a single camera 16 may capture a 2D image of each face of the article (by rotating the article). The controller 18 may project an outline of the 3D model onto the 2D images captured by the camera 16 and discard the portions of the 2D image that are outside of the outline. In this way, the controller 18 may discard the irrelevant portions of the 2D images. The remaining portions of the 2D images can then be assigned to the appropriate face of the 3D model. By assigning the appropriate 2D image to each side of the 3D model created from the dimensions of the article, a complete 3D model for a particular article is created where each side of the particular article can be uniquely identified. As discussed below, a picking system 300 may use a particular 3D model associated with a particular article to aid in picking and manipulating the article. As described herein, the resulting 3D model, 2D images, location of the 3D center of gravity, and other article attributes, or their locations, are stored in a corresponding database record for the article.

Figure 3:
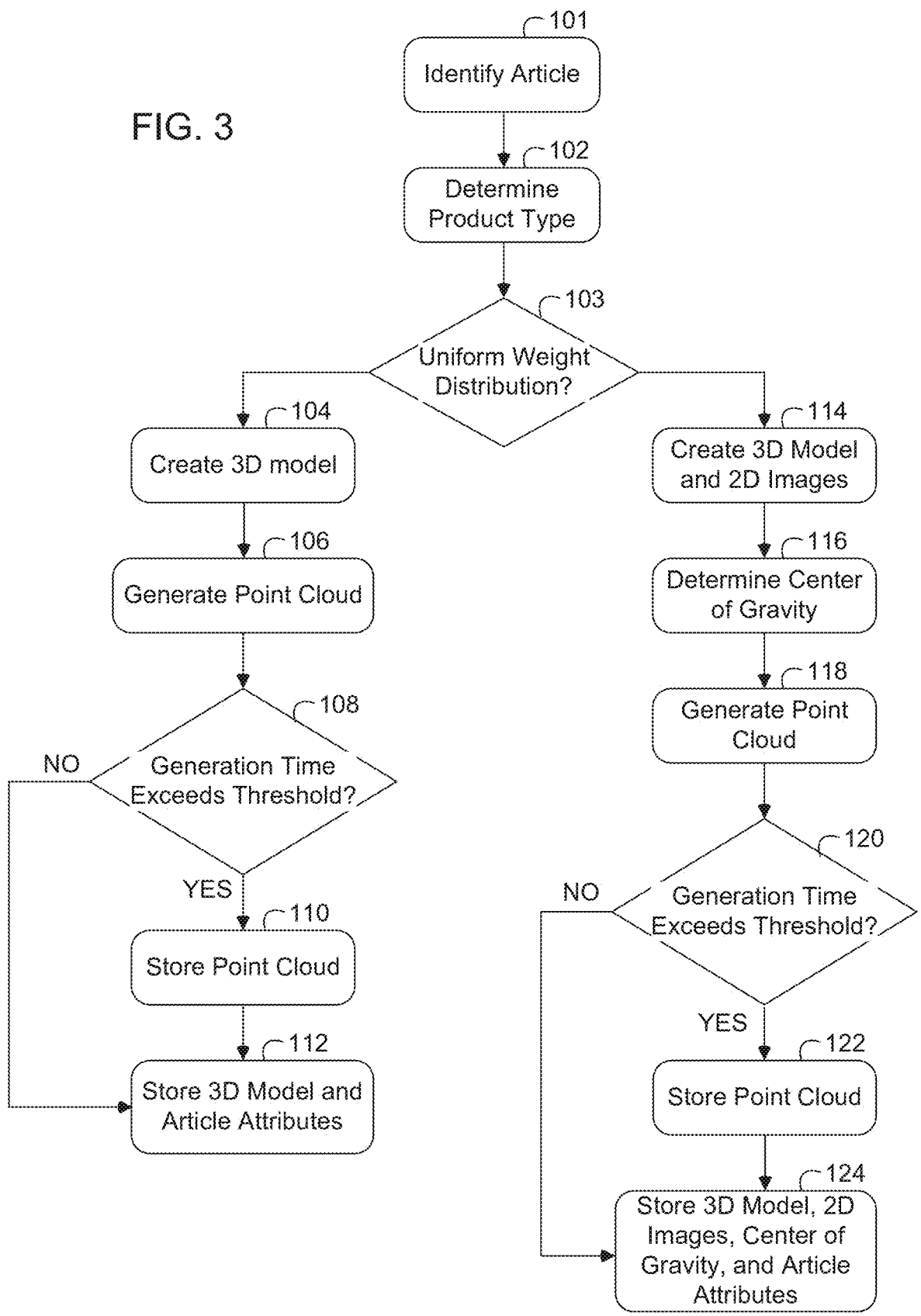
FIG. 3 is a flow chart of a method of training a robot to pick an article according to an embodiment of the invention.

Referring now to FIG. 3, a method of training a robot to pick a plurality of articles is depicted. At step 101, an article is identified. The article presented for identification may be identified by any appropriate method for inventory tracking. For example, Stock Keeping Units (SKUs) are a common format. The article may be identified by an operator manually providing the article's identification to the controller 18, or by scanning the article for an identification using equipment, such as a barcode reader, an RFID scanner, or the like. In step 102, a product type for the article is determined. Possible product types include "box," "irregular box," and "deformable" (bag). The product type may be manually entered by the operator, or in the alternative, autonomously determined by the processor 18 with inputs from one or more of the cameras 16 or other sensors (e.g., weight sensors 14). In an aspect of the present invention, for articles that are determined to be "deformable," attributes stored in the database record may include one or more instructions for proper picking of the deformable article. For example, the one or more instructions may include the location of a handle for grasping by robot, or a particular portion of the outer surface of the article that is identified as a picking location for the deformable article.

After identification and product type determination, in step 103, it is determined if the identified article has a uniform weight distribution. The term "uniform distribution of weight" is intended to mean that a location of a 3D center of gravity is substantially in the center of the identified article within a defined deviation, such that the article is balanced enough to be picked reliably from the center of any of the six article surfaces. This determination can be made manually performed by an operator or autonomously by the processor 18 with inputs from the weight sensors 14 and cameras 16. If it is determined that the identified article has a uniform weight distribution, in step 104, a 3D model of that particular article is created from the dimensions of the article. The dimensions of the identified article may be provided to the controller 18, either manually via input by the operator, or autonomously through the use of the cameras 16 or other equipment.

At step 106, a point cloud of the article, based on the 3D model, is created. A point cloud is understood to be a set of data points intended to represent the external surfaces of the article. In an exemplary embodiment of the present invention, the point cloud is created using coordinates of the 3D model to "fill in" the external surfaces of the model with a significant number of data points. The point cloud may be used by the picking system 300 to determine the current orientation of the article to be picked, as the picking system 300 rotates the point cloud until its orientation matches that of the randomly positioned article. Due to the large number of data points in a point cloud, the generation of the point cloud can require a significant amount of time. Therefore, it is beneficial for the training system 10 to have determined the amount of time required to generate a point cloud for a particular article prior to picking that article. The training system 10 measures the time required to generate the point cloud, and if the time required exceeds a predetermined threshold at step 108, the point cloud, or its location, is saved to permanent storage at step 110. Point clouds can require a significant amount of storage space to maintain, and therefore it is desired to maintain the point clouds in permanent storage only when beneficial to do so.

The predetermined threshold (for saving a point cloud) may be set to a value equal to the amount of time a picking system 300 has available between article identification and article picking. If the point cloud can be recreated in less than the time available, the picking system 300 can recreate the point cloud without affecting the throughput of the picking system 300. However, if more time is required, it is advantageous to have the point cloud (for the identified article) already created so that throughput of the picking system 300 is not impacted. In this situation, the picking system 300 can retrieve the particular point cloud from storage. Alternatively, the point cloud could always be maintained or never maintained, without reliance on a predetermine threshold. Regardless of whether the point cloud is stored at step 110, the 3D model of the article is stored at step 112. The 3D model (and potentially the point cloud) are stored in a database record that is based at least in part on the identification of the particular article. Therefore, later identification of the same article can retrieve one or more of the 3D model, attributes, and other data saved. Alternatively, the database record may merely store the location of the 3D model, attributes, and point cloud, with the actual data stored elsewhere in order to reduce the overall size of the database. As discussed herein, corresponding article attributes (e.g., physical dimensions, product type, weight distribution, and package balance) may be stored in each respective database record.

The identified article is determined to not have a uniform weight distribution if the article is not balanced enough to pick reliably from the center of at least one of the article surfaces. If the identified article is determined to not have a uniform weight distribution at step 103, a 3D model of the article is created at step 114. In addition to the 3D model, 2D images of each face of the article are also created at step 114. Each 2D image may be created by orienting the appropriate face of the article with one of the cameras 16. These resulting 2D images are communicated to the controller 18. The controller 18 may then project a corresponding outline of the 3D model onto each of the 2D images and then discard the portions of the 2D images that are outside of the outline. This allows the controller 18 to keep only the relevant portions of the images (the portions of the article) and reduce the overall size of the 2D images. These 2D images, in conjunction with the 3D model, are used by the picking system 300 to identify the side of the article facing the robotic manipulator regardless of the article's orientation.

After the models (3D model and 2D images) are created at step 114, the center of gravity of the article is determined at step 116. The center of gravity, or the center of mass, is the average location of the weight of the article. The controller 18 receives weight data from each of the weight sensors 14. As previously discussed, this data can be used by the processor 18 to calculate a first horizontal center of gravity. This calculation narrows a true or 3D center of gravity to a line through the article. To reduce this line to a single point, the article is rotated about a horizontal axis, preferably more than 30 degrees, and then tilted, and the weight data is obtained again. Alternatively, if the article cannot be tilted, the article may be rotated and then placed face down on the article support 12. Using this second set of weight data, the controller 18 calculates a second horizontal center of gravity. The 3D center of gravity of the article is determined from the mathematical intersection of the first horizontal center of gravity and the second horizontal center of gravity.

A point cloud is generated at step 118. Similar to the point cloud generated at step 106, the point cloud generated at step 118 will also be analyzed to determine the amount of time necessary for its generation. The amount of time required to generate the point cloud (at step 118) is analyzed at step 120. If the generation time exceeds a predetermined threshold, the point cloud (generated at step 118) is stored in the corresponding database record at step 122. Otherwise, the generated point cloud is discarded. Whether or not the point cloud is discarded, in step 124, the 3D model, 2D images, attributes, and the 3D center of gravity of the identified article, or their locations, are stored in the corresponding database record for the identified article. As discussed herein, the article attributes (e.g., physical dimensions, product type, weight distribution, and package balance) are also stored in each respective database record.

Figure 4:
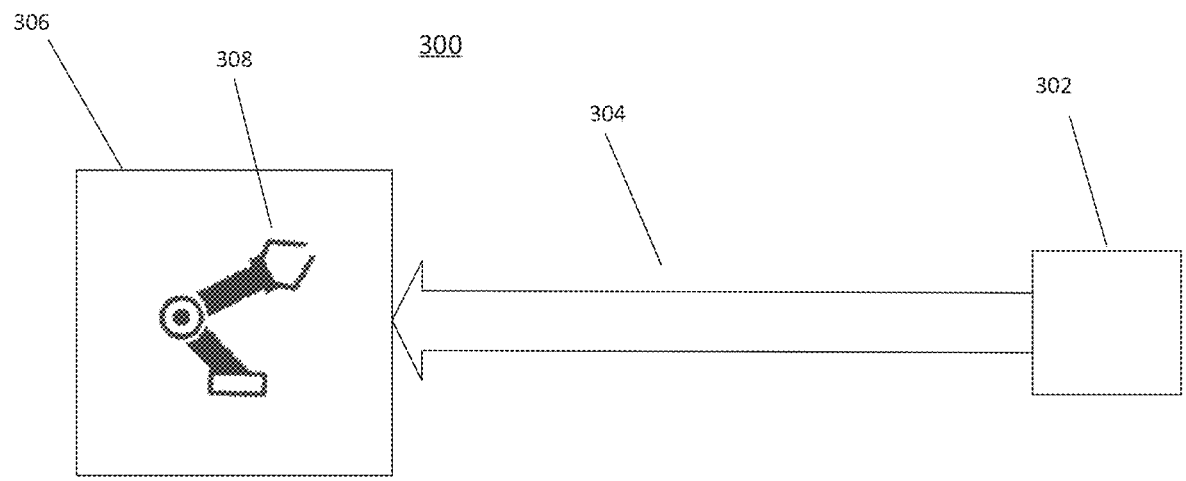
FIG. 4 is a top plan view of an exemplary picking system according to an embodiment of the invention.

Referring now to FIG. 4, an exemplary picking system 300 includes an identification station 302 configured for identifying an article, a conveying surface 304 configured for moving the article, and a picking station 306 with a robotic manipulator 308 configured for "picking" the article that has been moved by the conveying surface 304 to the picking station 306. The picking station 306 may be defined as that area that is reachable by the robotic manipulator 308 associated with the picking station 306. The identification station 302 may include one or more apparatuses for identifying an article, such as for example: a scanner for reading SKUs, other barcode readers, and RFID tag readers. Other scanning or reading systems and methods may also be utilized. Alternatively, an identification for the current article may be manually entered by an operator. Such as when the scanner fails to identify the article.

As discussed herein, regardless of the manner determined, once the identification of the article is determined, a corresponding database record for the identified article is retrieved by the picking system 300. In one embodiment, the picking system 300 utilizes a memory for storing the database. Each of the respective database records may contain a variety of information that is relevant to the corresponding articles. For example, the database record for a particular article may contain a corresponding 3D model or its location, whether the article has a uniform distribution, 2D images or their location(s), weight and other article attributes, and a location of a 3D center of gravity. As the article is moving down the conveying surface 304, the picking system 300 may be configured to determine whether the particular database record contains a point cloud for the article. If the database record does not contain a point cloud, a point cloud will be generated. Once at the picking station 306, the picking system 300 determines the article's orientation with respect to the picking station 306, based at least in part on the article's point cloud (which has been determined or retrieved). The picking system 300 determines the article's random orientation by rotating or adjusting the point cloud until the orientation of the point cloud matches the orientation of the article based upon image data captured by the picking station's cameras. As described herein, with the article's orientation determined, a picking location on the article (for picking the article with the robotic manipulator 308) is identified. Once an appropriate picking location for the article at the picking station 306 has been identified or determined, as defined by the corresponding database record, the robotic manipulator 308 is used to pick the article (at the selected picking location).

Figure 5:
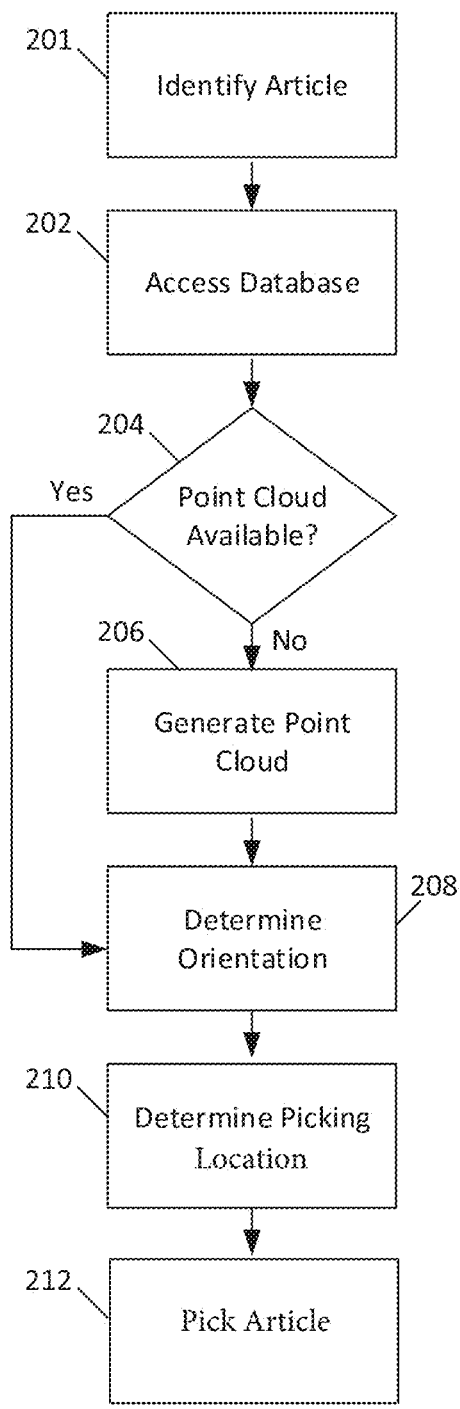
FIG. 5 is a flow chart of a method of picking an article with a robot manipulator according to an embodiment of the invention.

A method for picking an article is illustrated in FIG. 5. In step 201, the picking system 300 identifies an article at the identification station 302. As discussed herein, the identification is accomplished by scanning SKUs or reading RFID tags. Once identified, a corresponding database record for the identified article is accessed and retrieved at step 202. The retrieved database record comprises information relevant to the identified article, including, but not limited to, the 3D model or its location, whether the article has a uniform distribution of weight, 2D images or their location, weight of the article, and a 3D center of gravity, for example. As the article proceeds along the conveying surface 304, in step 204, it is determined if the retrieved database record references an existing point cloud. If the retrieved database record does not reference a point cloud, a point cloud is generated at step 206. In step 208, with the article at the picking station 306, the picking system 300 determines the article's orientation based at least in part on the point cloud (either generated or retrieved). As discussed herein, the point cloud is rotated or adjusted until the point cloud's orientation matches the random orientation of the article based upon image data captured by the picking station's cameras of the article.

After determining the orientation of the article at step 208, the picking system 300, at step 210, determines the appropriate picking location of the article. If the article has a uniform distribution of weight, the appropriate picking location might be the center of the face most accessible to the robotic manipulator 308. As discussed herein, when the article has a uniform distribution of weight, the article is balanced enough to pick reliably from the center of any of the article's six sides. However, if the article does not have a uniform distribution of weight, the picking station 300 will determine the picking location based at least upon the orientation of the article and the 3D center of gravity of the article. Generally, the ideal picking location is as near the 3D center of gravity of the article as feasible. As discussed herein, the article attributes may include pick offsets, non-pickable surfaces, and other prompts to prevent the article from being picked on an improper side (and potentially dropped). In step 212, once the picking location is determined, the picking station 300 uses the robotic manipulator 308 to pick the article at the selected picking location. Typically, such picking will be done with a robotic manipulator 308 equipped with a vacuum cup or other mechanical gripper, but other methods can also take advantage of the benefits of the described invention.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A method of training and controlling a robot to pick a plurality of articles, the method comprising:
    determining, with a sensor, an identity of an article from the plurality of articles;
    receiving, with a processor, a plurality of weight sensor readings for the article;
    using the received weight sensor readings to determine, with the processor, if the article has a uniform distribution of weight, wherein a uniform distribution of weight includes a location of a three dimensional (3D) center of gravity substantially in the center of the article; and
    responsive to the article having a uniform distribution of weight:
    creating, with the processor, at least one model of the article; and
    storing, with the processor, at least a location of the at least one model or the at least one model in a database record based at least in part on the identity of the article; and
    responsive to the article not having a uniform distribution of weight:
    creating, with the processor, at least one model of the article;
    determining, with the processor, the location of the 3D center of gravity of the article; and
    storing, with the processor, at least the 3D center of gravity and a location of the at least one model or the at least one model in a database record based at least in part on the identity of the article;
    determining a picking location of the article based at least in part on the at least one model in the database record; and
    controlling a robotic manipulator to pick the article based on the determined picking location.

2. The method of claim 1, wherein creating at least one model of the article further comprises creating a 3D model of the article.

3. The method of claim 2 further comprising responsive to the article not having a uniform distribution of weight: creating a two-dimensional (2D) image of each side of the article and storing the 2D images, or a location of the 2D images, in the database record.

4. The method of claim 3, wherein creating the 2D images further comprises rotating the article such that each face of the article is directed towards an imaging camera, wherein the imaging camera captures a 2D image of each face.

5. The method of claim 3, wherein creating the 2D images further comprises projecting a corresponding outline of the 3D model onto each of the 2D images and discarding portions of the 2D images that are outside of the outline.

6. The method of claim 1, wherein determining the location of the 3D center of gravity further comprises:
    determining a first horizontal center of gravity of the article;
    rotating the article on a horizontal axis;
    tilting the article;
    determining a second horizontal center of gravity of the article; and
    determining, based at least in part on the first horizontal center of gravity and second horizontal center of gravity, the 3D center of gravity of the article.

7. The method of claim 6, where the article is rotated at least 30 degrees.

8. The method of claim 6, wherein determining each of the first horizontal center of gravity and the second horizontal center of gravity further comprises weighing the article by placing the article on a support coupled with at least three weight sensors.

9. The method of claim 8, wherein the support is coupled with four weight sensors.

10. The method of claim 1, wherein determining the identity of the article further comprises reading a stock keeping unit (SKU) located on the article.

11. The method of claim 1 further comprising generating a point cloud and storing the point cloud if the generation of the point cloud takes longer than a predetermined amount of time and discarding the point cloud if the generation of the point cloud takes shorter than or equal to a predetermined amount of time.

12. The method of claim 1 further comprising determining a product type for the article.

13. The method of claim 12, wherein the product type includes one of box, irregular box and deformable box.

14. The method of claim 13, wherein an article with a deformable box product type also includes instructions for proper placement and handling.

15. The method of claim 1 further comprising determining an orientation of the article based at least in part on the 3D model, wherein determining a picking location is also based at least in part on the orientation of the article.

16. The method of claim 15, wherein determining the orientation of the article is based at least in part on a point cloud generated from the 3D model.

* * * * *